(12) United States Patent
Fankhauser et al.

(10) Patent No.: US 9,523,604 B2
(45) Date of Patent: Dec. 20, 2016

(54) CALIBRATION DEVICE FOR A FORCE-MEASURING DEVICE, AND FORCE-MEASURING DEVICE

(75) Inventors: George Fankhauser, Erlenbach (CH); Markus Uster, Nänikon (CH); Martin Heusser, Kilchberg (CH); Ferdinand Schneider, Winterthur (CH)

(73) Assignee: METTLER-TOLEDO GMBH, Greifensee (CH)

( * ) Notice: Subject to any disclaimer, the term of this patent is extended or adjusted under 35 U.S.C. 154(b) by 772 days.

(21) Appl. No.: 13/205,335

(22) Filed: Aug. 8, 2011

(65) Prior Publication Data
US 2012/0010840 A1    Jan. 12, 2012

Related U.S. Application Data

(63) Continuation of application No. PCT/EP2010/051391, filed on Feb. 5, 2010.

(30) Foreign Application Priority Data

Feb. 6, 2009  (EP) ..................................... 09152278

(51) Int. Cl.
G01G 23/01    (2006.01)
G01G 23/37    (2006.01)

(52) U.S. Cl.
CPC ........ *G01G 23/012* (2013.01); *G01G 23/3728* (2013.01)

(58) Field of Classification Search
CPC ........ G01G 23/01; G01G 23/14; G01G 23/12; G01G 21/00
See application file for complete search history.

(56) References Cited

U.S. PATENT DOCUMENTS 4,858,161 A * 8/1989 Baumann ....................... 702/101
4,890,246 A   12/1989 Oldendorf et al.
(Continued)

FOREIGN PATENT DOCUMENTS

DE   102007036214 A1   6/2008
JP        1-270622 A   10/1989
(Continued)

*Primary Examiner* — Gregory J Toatley
*Assistant Examiner* — Kyle R Quigley
(74) *Attorney, Agent, or Firm* — Standley Law Group LLP (57) ABSTRACT

The invention concerns a calibration device (40) for a force-measuring device (1), specifically a balance, with an electrically controllable force-generating means (41) designed to be coupled to a force-measuring cell (10) of a force-measuring device (1) in such a way that a predefined force ($F_C$) can be applied to the force-measuring cell (10), so that the latter generates a measuring signal ($S_F$) which correlates to the applied force ($F_C$) and which can be transmitted to a processing unit (60, PU), where it can be processed in reference to the predefined force ($F_C$). The calibration device (40) includes a calibration control unit (CCU) which has access to at least one predefined parameter (P) characterizing the force-measuring device ((1) and/or the calibration device (40), wherein the calibration control unit (CCU) can be connected by way of a communications link (52) to the processing unit (60, PU) in order to exchange information signals ($S_{CD}$) with the latter, and wherein the calibration control unit (CCU) is configured to generate control signals based on the information signals ($S_{CD}$) and the parameter (P) in order to thereby control the force-generating means (41).

27 Claims, 2 Drawing Sheets

(56) References Cited

U.S. PATENT DOCUMENTS

| | | | |
|---|---|---|---|
| 4,977,969 A | | 12/1990 | Leisinger et al. |
| 5,058,422 A | | 10/1991 | Shimauchi |
| 5,148,881 A | * | 9/1992 | Leisinger ............. G01G 23/012 |
| | | | 177/229 |
| 5,191,543 A | * | 3/1993 | Berthel et al. ................ 702/101 |
| 5,491,540 A | * | 2/1996 | Hirst ............................... 399/12 |
| 7,596,984 B2 | | 10/2009 | Genoud et al. |
| 7,631,536 B2 | | 12/2009 | Genoud et al. |
| 7,975,526 B2 | | 7/2011 | Genoud et al. |
| 2006/0196700 A1 | * | 9/2006 | Genoud et al. ................ 177/50 |
| 2007/0034422 A1 | * | 2/2007 | Genoud et al. ............... 177/211 |

FOREIGN PATENT DOCUMENTS

| | | |
|---|---|---|
| JP | 6-84319 U | 12/1994 |
| JP | 10-132649 A | 5/1998 |
| JP | 2004-156905 A | 6/2004 |
| WO | 2004/088259 A1 | 10/2004 |

\* cited by examiner

CALIBRATION DEVICE FOR A FORCE-MEASURING DEVICE, AND FORCE-MEASURING DEVICE

CROSS-REFERENCE TO RELATED APPLICATIONS

This application is a continuation under 35 USC §120 of PCT/EP2010/051391, filed on Feb. 5, 2010, which is, in turn, entitled to and claims benefit of a right of priority under 35 USC §119 from European patent application 09152278.9, filed on Feb. 6, 2009. The content of each of these applications is incorporated by reference as if fully recited herein.

TECHNICAL FIELD

The present invention relates to a calibration device for a force-measuring device, in particular for a balance, and a force-measuring device that is suitable for the calibration device.

BACKGROUND

A force-measuring device normally includes a force-receiving part, a force-transmitting part, a force-measuring cell, and a device for the processing of the measuring signals. To perform a force measurement, the force is received by means of the force-receiving part and transmitted by way of the force-transmitting part to the force-measuring cell, where it acts as input force to the force-measuring cell. For example in a weighing device, the force to be measured is constituted by the weight force of the weighing object which is applied to the force-receiving part (in the form of a weighing pan) and transmitted through the force-transmitting part (in the form of a linkage) to act on the force-measuring cell, the so-called weighing cell.

The force-measuring cell is a mechanical-to-electrical transducer which converts the input force into an electrical measuring signal. This measuring signal, which corresponds to the input force, is transmitted to a processing unit, where it is processed and evaluated. The results of the processing are passed on in the form of measurement values to an indicator unit or to a further processing unit, for example a higher-level computer or a system controller.

In order to ensure a consistently high accuracy, it may be necessary from time to time to perform a corrective procedure called calibration. This entails that a force of a predefined magnitude is applied to the force-measuring cell, so that the force-measuring cell generates a measuring signal which corresponds to the predefined force and is transmitted to the processing unit. Based on the correlation between a predefined force and the measurement values derived from it, it is possible to take appropriate corrective measures, for example to adjust the calculation parameters in the processing unit.

The functions of generating the predefined force and transmitting this force to the force-measuring cell are often performed by a calibration device. During the process of a calibration, the calibration device or at least part of it, for example a calibration weight, is coupled to the force-measuring cell through a force-transmitting connection, and the force that is thereby generated is transmitted to the force-measuring cell. At the completion of the calibration cycle, the coupling is disconnected so that when the force-measuring cell is working in its normal measuring mode, it is separated from the calibration device.

A dead-weight loading machine is disclosed in DE 10 2007 036 214 A1 which serves for the calibration of a wide variety of force-measuring devices, for example in a national standards laboratory. The machine described there includes a pressure plate which can support a force transducer that is to be calibrated, as well as a rack with predefined weights which can be connected from the outside to the force transducer either individually or in any combination. The loading and lifting of the weights occurs by means of a pneumatic actuator element system, wherein the latter can in particular have the capability of being controlled automatically. In such an arrangement, the electrical output of the force transducer, for example a force-measuring cell, is connected to the control system. The automatic control is performed interactively by means of a menu-driven application-specific software program. Prior to the start of the calibration, the user is required to enter parameters concerning the force-measuring cell as well as the calibration procedure. The selection of the weights as well as the evaluation of the results and the issuance of a calibration reports can likewise take place automatically.

Calibration devices which are assigned to a force-measuring device in order to calibrate the latter when needed are known in the existing state of the art. For example, CH 676 750 A5 discloses a calibration device with a predefined calibration weight which can be lowered by means of a lifting device onto a carrier that is coupled to the force-measuring cell, whereby the calibration weight is coupled to the force-measuring cell. At the beginning of the calibration cycle, the calibration weight is moved vertically downward by means of an electric motor and a rotating screw spindle and then raised up again after the calibration has been completed. The lifting device can be configured as an autonomous unit and can be adapted for use with calibration weights of different sizes. However, the capabilities of this calibration device for adaptation to different force-measuring devices or to specific requirements are limited. Yet, it remains a desirable attribute for a calibration device to be flexible and simple to adapt to the requirements of the applications in which it is used and of the force-measuring device to which it is assigned.

It is therefore one object of the present invention to provide a calibration device for a force-measuring device which can be adapted in a simple manner to different requirements. A further goal is to achieve a simple and cost-effective configuration and operation of the force-measuring device, and at the same time to meet stringent requirements in regard to measurement accuracy and stability.

SUMMARY

This task is solved by a calibration device having the features specified in the independent claims. Further advantageous embodiments of the invention are presented in the further, dependent claims.

The preferred embodiment of the invention is directed at a calibration device of a force-measuring device, specifically of a balance, with an electrically controllable force-generating means which can be coupled to a force-measuring cell of a force-measuring device in such a way that a predefined force can be applied to the force-measuring cell, so that the latter generates a measuring signal which correlates to the applied force and which can be transmitted to a processing unit where it can be processed in reference to the predefined force. The calibration device includes a calibration control unit which preferably has access to at least one predefined parameter which characterizes the force-measuring device and/or the calibration device and wherein the calibration control unit can be connected by way of a communications link to the processing unit in order to exchange information signals with the latter. The calibration control unit is preferably configured to generate control signals based on the information signals and the parameter in order to thereby control the force-generating means.

The present invention makes an exchange installation of the calibration device in a force-measuring device significantly easier, so that the calibration device can be adapted in a simple and flexible manner to the most diverse requirements. For example, the calibration device can be adapted to different types of force-measuring devices or to specific requirements, particularly in regard to accuracy, stability or cost factors, of the application in which a calibration device is used.

The term "parameter" in this context should be construed as any value, quantity, or group of values and quantities. This parameter or the parameter group can encompass all essential characteristics or only a subset of those values which characterize the force-measuring device and/or the calibration device. The characteristics being considered here can be of a general nature, containing for example a type-, model-, design designation or a version number. However, they can also include specific characteristics, for example characteristic values concerning the operating behavior or the operating condition of the force-measuring device or the calibration device, or the geometric conditions regarding the coupling of the calibration device to the force-measuring device.

The present invention ensures that the specific functions of the force-generating means, and the way in which its individual components work together, are centrally controlled and monitored by the calibration control unit. Accordingly, system-related deviations, characteristic operating sequences and production tolerances can be corrected and/or compensated locally, i.e. within the calibration device. These deviations can, for example, be the result of differences in the characteristics of the drive motor, its operating properties, or production-related differences of the calibration weight. This information can be processed in the calibration control unit, or it can also be communicated to the processing unit, where these differences can be taken into account for the calculation of the correction parameters.

The calibration control unit of the present invention makes it possible to achieve a high degree of flexibility in the adaptation of the force-measuring device to a wide range of different requirements. For example by controlling and/or guiding the operating behavior of the force-generating means directly through the calibration control unit, one achieves a large degree of isolation from external influence factors and dependencies. Thus, model changes of the force-generating device will affect only the associated calibration control unit but have no consequences for the processing unit.

Furthermore, in spite of the increased complexity resulting from the addition of the calibration control unit, a calibration device can be realized with an overall cost advantage. This concept offers a cost-effective way of manufacturing and delivering a large number of identical force-measuring devices which are then adapted to customer-specific requirements shortly before final shipment. This results in significant savings in the logistics and organization of the distribution.

Furthermore, the direct allocation of the force-generating means and the calibration control unit to each other allows for an optimal adjustment between these components. When generating the control signals, the calibration control unit can thus take the characteristic properties of the force-generating means specifically into account. It is possible, for example, to use entirely different technologies for the force-generating means without the need for adaptations in the force-measuring device. Depending on customer-specific requirements, the predefined force can thus be generated by a weight force or by another principle, for example employing the piezoelectric effect.

Furthermore, with the electrically controlled force-generating means, the control signal can be optimally adapted to the force-generating means. For example in a force-generating means in which a calibration weight can be moved by an electric motor, the type and characteristics of the electric motor can be taken into account in generating the control signals. In addition, parameters such as the displacement interval, optimal acceleration and velocity of the calibration weight can enter into the determination. Such parameters can also be defined in the form of a mathematical function of any kind or in the form of a given time profile.

It is also possible to use other mechanisms to move the calibration weight, for example a pneumatic drive source or a lifter device based on the piezoelectric effect. In each case, the calibration control unit can use the characteristic operating data of these drive sources and tie them as parameters into the process of generating the control signals.

As a further function, if errors are detected during operation, in particular during a calibration cycle, the calibration control unit can transmit messages in the form of warning signals from the calibration device to the processing unit. In this case, too, interchangeability can be significantly improved by using a uniform structure for the error messages.

The calibration device according to the invention is not limited to a specific kind of force-measuring device, but can be used universally in conjunction with a multitude of different force-measuring devices. The calibration device can be used in particular for force-measuring devices that are based on the principle of measuring a deformation by means of strain gauges, or on the principle of electromagnetic force compensation.

In one example embodiment of the invention, the calibration control unit includes a program which is either fixed or alterable and serves to process the at least one parameter and the information signals and to generate the control signals. This allows the control unit to be flexibly adapted to new application tasks and to changes in the signal-processing system. The program preferably has the capabilities for being altered, reprogrammed or exchanged under the control of the processing unit.

In another example embodiment, the calibration control unit includes a memory element for the storage of the parameter, and/or the calibration unit is designed to receive the parameter from the processing unit through the exchange of information signals. This allows the at least one parameter to be adapted in a simple manner to new operating conditions. For example in an initialization phase of the force-measuring device, the parameter can be determined by the latter and transmitted to the calibration control unit, where it can be stored in the memory element. The memory element may be configured as non-volatile memory so that a loss of data can be avoided even in case of a power interruption, for example during an exchange of the calibration device.

Preferred among attributes being characterized by the parameter are the type of the force-measuring device or the functional principle or the measurement range or the measurement accuracy or the stability of the measurements or the intended area of application of the force-measuring device. The parameter can further characterize the type or the functional principle of the calibration device, in particular at least one dimension in space which defines the coupling of the force-generating means to the force-measuring cell. Other characteristics that can be expressed by the parameter include the type of the force-generating means, in particular its functional principle, or the magnitude of the force to be generated, or the rate of change or acceleration of change of the force, or the length of the displacement interval.

Other combinations in the form of a set or group of different parameters are also possible. A parameter set can be a combination of different ones of the aforementioned categories and subcategories. For example, a parameter set can encompass the width of the measurement range of the force-measuring device, the torque of the drive motor, the maximum touch-down velocity at the coupling engagement, and the amplitude of the maximally permissible vibratory disturbances.

In an advantageous preferred embodiment of the invention, the calibration control unit is designed to generate an analog control signal which is transmitted through a control line to the force-generating means in order to control the latter, wherein the control signal corresponds to the information signals and/or to internal events determined by the calibration device. With this control arrangement, it is possible to use generic and/or standardized control information as well as the internally determined information efficiently for the direct and specific control of the force-generating means.

In another example embodiment, the calibration control unit is designed for the exchange of the information signals in digital and/or coded format and/or in bidirectional mode and/or in the form of data packets and/or for the connection to a bus system. This makes it possible to achieve an efficient transmission of the information signals which is very robust against disturbances. Also, additional components of the force-measuring device which are equipped with a control unit with data communication can be controlled in the same manner, for example a light gate or a Hall sensor. Consequently, an efficient communication system with a plurality of participants can be realized. By encoding the information, for example in binary code or ASCII code, it is possible to transmit it in a compact and efficient way in a universal, widely compatible form.

In a preferred embodiment, the calibration control unit has a logic interface, so that the transmitted information can be exchanged according to a predefined, in particular standardized, specification, and/or the calibration control unit is designed for the exchange of the information signals in accordance with a communications protocol, in particular a standardized protocol. Thus, the calibration control unit can be built as a universal component in large production runs and accordingly at a favorable cost. In addition, there are standardized tools such as test programs available for the diagnosis and correction of errors.

The calibration control unit is preferably arranged on a holder or base plate which supports the force-generating means, and/or the calibration control unit is arranged so that the spatial distance between the calibration control unit and the force-generating means is significantly shorter than the spatial distance between the calibration control unit and the processing unit. As a result, a very compact design with short, robust control lines can be achieved. In this arrangement, the spatial distance between the calibration control unit and the force-generating means amounts to a few millimeters up to a few centimeters. The calibration control unit can also be arranged in immediate proximity of the force-generating means, for example by joining them directly together.

In a further preferred embodiment, the calibration device includes a connector element, which forms an electrical interface, in particular a standardized interface, for the connection to the communications link, and/or is designed as a separable plug connection or as a connector terminal. This enables a particularly flexible exchange of the calibration device without the need for expensive electrical adaptations such as for example a matching of impedances. The connector element is preferably configured as a separable plug connector or connector terminal, so that the calibration device can be installed or exchanged quickly and conveniently.

In further preferred embodiment, the calibration device is designed to perform the functions of deriving instruction from the information signals, evaluating the instructions based on given criteria, and controlling the force-generating means in accordance with the results of the evaluation. Such criteria can be given for example by way of a predefined set of instructions, plausibility limits, or parameters indicating the condition of the calibration device. Preferably, the criteria are evaluated by executing a program. The program can receive the criteria in the form of given values and/or given instructions, for example as preprogrammed fixed values or as stored values which are read from a memory unit by means of the program. The values can also be made available to the program through a transmission.

In a particularly preferred embodiment of the invention, the calibration control unit is programmable and/or includes a memory element in which data, measurement values or programs can be stored. This allows the calibration control unit to be flexibly adapted to new tasks and/or changed operating conditions. The data can include information that is needed for the operation and monitoring of the calibration device as well as for the control of the communication. Examples of data that can be stored in the memory element include the exact weight of the calibration body or production tolerances and/or load alternations of the drive mechanism. These data can be determined for example by the manufacturer of the calibration device through a test measurement and then stored in memory. This procedure can thus be performed independently of the production process of the force-measuring device.

The stored data can also include a unique identification number, which can serve as the basis for addressing messages to the calibration control unit or identify messages coming from the calibration control unit. It is further conceivable that diagnostic data of the calibration device are stored in the memory unit, for example the number of operating hours, incidences when load limits were exceeded, and/or records of over-the-limit temperatures.

The memory unit can further serve for the storage of programs and operating parameters of the individual components, in particular of the calibration control unit itself. It can further hold serial numbers, version numbers of the individual components, version numbers of the programs, and/or the version number of the calibration data. These data can be accessed on the one hand by the calibration control unit, but also by the processing unit. The decentralized storage strongly simplifies the management of this information, particularly in the case of an exchange of the calibration device.

The memory element is configured preferably as a non-volatile memory, so that the stored data are preserved even during an interruption of the power supply. Furthermore, the memory element can be incorporated together with the calibration control unit in a microprocessor.

In a preferred further developed embodiment, when a calibration is to be performed, the speed at which the force is applied can be controlled dependent on the position of the force-generating means. For example, the lowering of a calibration weight onto a carrier that is coupled to the force-measuring cell can follow a predefined velocity profile. This is especially important for exceptionally sensitive weighing sensors, as it ensures a precise and specific application of the predefined force.

The calibration device in a preferred embodiment includes a clock which serves to control the time-dependent behavior of the calibration device, for example for the registration of events or to record a defect, whereupon appropriate action can be initiated and the respective event can be stored in a log file in the memory of the calibration control unit together with a time marker.

In a further embodiment of the invention, the force-generating means is equipped with a calibration weight which serves to generate the predefined force and is arranged in particular with the ability to be moved, so that by changing its position it can be coupled to the force-measuring cell. As the weight of the calibration weight undergoes no changes or only very small changes over time, this arrangement allows a constant and stable force to be generated. Accordingly, the calibration that can be achieved with it is largely free of aging effects.

In a further preferred embodiment, the force-generating means includes a drive unit, in particular an electric motor, which serves to actuate the coupling of the force being generated, in particular through the capability of the drive unit to generate a position change of a calibration body. This allows the force-generating means to be built and operated in a cost-effective manner.

In a further embodiment, the calibration device is configured as a modular unit with at least one mechanical interface which is determined in particular by at least one given installation dimension and/or a part of a guide track and/or a given fastening location. A high degree of interchangeability can thus be achieved, and the cost and effort for mechanical adaptations for the exchange can be eliminated or at least strongly reduced.

The calibration device in a further embodiment includes at least one sensor which is connected to the calibration control unit and which generates an electrical signal that can be used to control the force-generating means. As a result, a better response to additional influence factors can be achieved. The signals of the sensors can also be transmitted as information to the processing unit.

Preferably, the sensor serves on the one hand for the determination of an operating condition, in particular for the determination of a play under changing loads, a position change, a temperature, or a current/voltage supply, or on the other hand for the determination of an external influence of the ambient environment, in particular an ambient temperature and/or a mechanical disturbance and/or vibration. Influence factors and disturbances of many kinds can thereby be detected and taken into account in an appropriate manner for the control of the force-generating means.

For example, a sensor for the measurement of the play under changing loads can serve to determine an age-related or wear-related increase of the play under changing loads. Based on this information, the positioning and thus the coupling of the calibration device to the force-measuring cell or the time profile of applying the force can be adapted accordingly. Such developments can also be reported to the processing unit and registered by the latter. Information of this kind can subsequently be used for example in the planning of maintenance- and repair work.

The sensor for the determination of a position change can also be configured as a contact switch or a light gate. This provides the possibility to send a signal to the calibration control unit when the force-generating means has reached an end position. Occurrences of this kind are primarily of local significance within the calibration device, where they can be acted on in a specific manner.

In a preferred embodiment, the calibration control unit is configured with the ability to make autonomous decisions, i.e. decisions that are independent of any user input, regarding the control of the force-generating means based on the available information. This accomplishes the objective of a largely self-contained, independent calibration device which, as an autonomous unit, is capable to respond quickly, efficiently and specifically to a current situation as it presents itself, for example by executing a calibration in case this becomes necessary.

A further embodiment according to the invention concerns a force-measuring device with a force-measuring cell and the afore-described calibration device consolidated into a unit, wherein during a calibration cycle the calibration device is coupled to the force-measuring cell in order to apply the predefined force, and wherein the force-measuring cell is connected to a processing unit, in particular by way of the communications link, in order to transmit the measuring signal generated by the force-measuring cell to the processing unit for processing. During this phase, the force generated by the force-generating means is applied to the force-measuring cell. The calibration device thus forms a functional unit within the force-measuring device. This facilitates exchanging the calibration device and adapting it to customer-specific requirements.

In a preferred embodiment, the processing unit is designed with the capability to determine and/or calculate the parameter and/or to transmit the latter to the calibration control unit and/or to read the parameter from the calibration control unit. Thus, the parameter or parameter set can be processed and/or evaluated or checked in the processing unit. This makes it possible to achieve an individually optimized and flexible mutual adaptation between the calibration device and the force-measuring device.

In a preferred embodiment, the communications link is configured for the bidirectional and/or digital communication and/or as a bus system and/or as a system for the exchange of data in the form of packets. By using the communications link in this way, information can be exchanged flexibly and cost-effectively. In particular with a bus system, the cost and complexity of the cabling can be kept low. In addition, the communications link can also be used for other components of the force-measuring device, for example for further measurement sensors.

In a further embodiment, the calibration device has a movable calibration body, so that by moving the calibration body a contact can be established with a seating location of the force-measuring cell in order to couple the calibration device to the force-measuring cell. This allows on the one hand a force-transmitting connection to be achieved during the calibration and on the other hand to exclude the possibility of disturbing the force-measuring cell during operation in the normal measuring mode.

In a further embodiment according to the invention, the movable part of the force-measuring cell is rigidly connected to a force-transmitting arm which has a seating location at its free end, through which the calibration device can be coupled to the force-measuring cell. With this force-transmitting arm it is possible to achieve more design freedom in the arrangement of the force-measuring cell and the calibration device.

It should further be mentioned that, preferably, the power supply connection of the calibration device is also realized in the form of a standardized electrical interface in order to ensure a high degree of flexibility in case of an exchange.

BRIEF DESCRIPTION OF THE DRAWINGS

Details of the calibration device according to the preferred embodiment of the invention and also of a force-measuring device to which this kind of a calibration device may be coupled, as well as of the method according to the invention, will be apparent from the description of the examples of embodiments shown in the drawings, wherein.

DETAILED DESCRIPTION OF THE DRAWINGS

Figure 1:
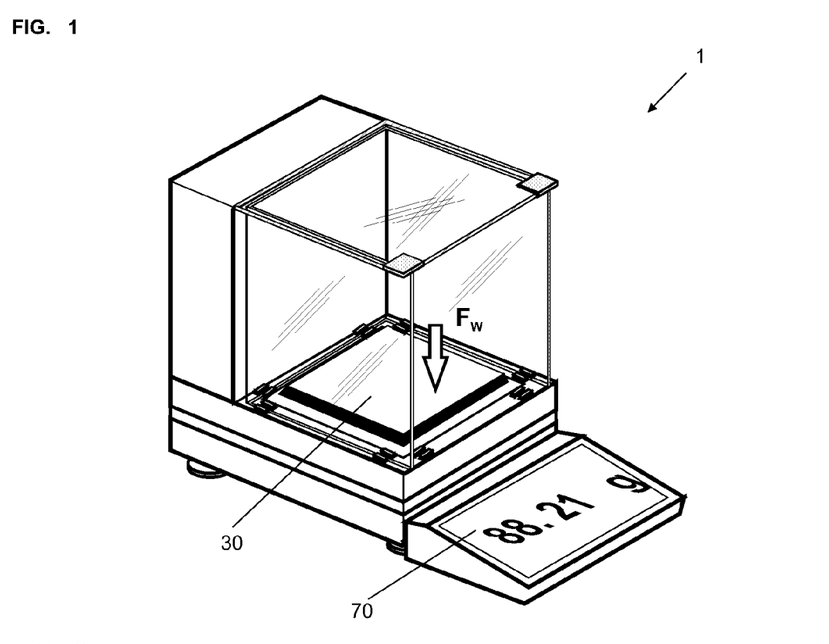
FIG. 1 shows a force-measuring device in the form of a balance in an exemplary embodiment wherein the applied force $F_W$ is indicated symbolically, with a force-receiving part and an indicator unit.

FIG. 1 shows a force-measuring device 1 in the form of a balance in an exemplary embodiment, wherein the applied force $F_W$ is indicated symbolically, which is acting on the force-receiving part 30 in the form of a weighing pan. This force $F_W$ is measured with the force-measuring device 1, and the result of the measurement is communicated to a user through an indicator unit 70, for example a liquid crystal display.

Figure 2:
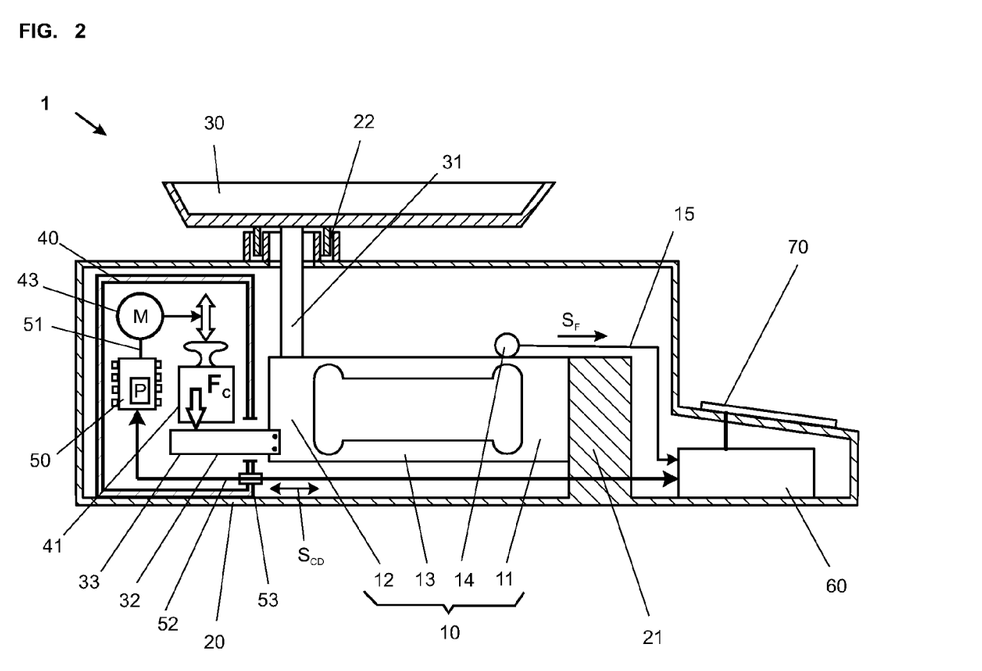
FIG. 2 shows a sectional view of a balance in a simplified schematic form of representation, with a force-measuring cell to which a calibration device can be coupled in order to apply a predefined force $F_C$ to the force-measuring cell.

FIG. 2 shows a simplified schematic drawing of an exemplary force-measuring device 1 in the form of a balance in a sectional view. The balance has a housing 20 in whose interior space a force-measuring cell 10 is arranged.

The force-measuring cell 10 in the exemplary embodiment has a stationary part 11 and a movable part 12 which are connected to each other through an intermediate part 13 by way of flexible transitions. The force-measuring cell 10 further includes a measuring sensor 14 which measures the movements of the movable part 12 and converts them into a measurement signal $S_F$ corresponding to the movements. For the sake of simplicity, the force-measuring cell 10 is shown with only one measuring sensor 14. Typically, four measuring sensors 14 may be used, each of which is arranged at one of the flexible transitions where the intermediate part 13 meets the stationary part 11 and the movable part 12. The measurement sensors 14 are preferably strain gauges.

In the exemplary embodiment, the stationary part 11 of the force-measuring cell 10 is rigidly connected to the housing 20 by way of the housing-based support 21. A force-receiving part 30 in the form of a weighing pan which is arranged outside of the housing is connected through a rod 31 to the movable part 12 of the force-measuring cell 10 which is arranged in the interior space. The rod 31 traverses the housing 20 without contacting the latter, by way of a housing pass-through 22. The pass-through 22 is designed to prevent, or to at least strongly reduce, the penetration of dirt.

The measurement sensor 14 is connected through a measurement signal line 15 to a processing unit 60 in order to transmit the measurement signal $S_F$ generated by the measurement sensor 14 to the processing unit 60. The processing unit is connected through the further connecting line to the indicator unit 70 in order to transmit the measurement values determined by the processing unit 60 to the indicator unit 70.

An exemplary embodiment of the calibration device 40 of the present invention is arranged in close proximity to the force-measuring cell 10 and also in the interior space of the housing 20. The calibration device 40 has a separate housing, in which a calibration weight 41 is arranged with the ability of limited movement. The calibration weight 41 can be lifted and lowered by a drive element 43. The drive element 43 is configured as an electric motor M, which is directed by suitable control signals, for example by stepper pulses or through an appropriate control of the power supply.

According to the preferred embodiment of the invention, the calibration device 40 includes a calibration control unit 50. Arranged in the latter is a memory element, in which the values of a parameter P can be stored. The parameter P is thus made available to the calibration control unit 50 as a predefined value for issuing the control signals. The parameter P can define the characteristic of the force-measuring device 1 as well as the characteristic of the calibration device 40. The memory element is configured as a non-volatile memory, so that the calibration device 40 can be exchanged in a simple manner without loss of data.

In the preferred embodiment, the calibration control unit 50 is connected through a connection line to a connector element 53. The connector element 53, in turn, is connected through a connector line to the processing unit 60. These connector lines form a communications link, which in this example is configured as a communications link 52. With this arrangement, information signals $S_{CD}$ can be exchanged bidirectionally between the calibration control unit 50 and the processing unit 60.

In the preferred embodiment, the calibration control unit 50 is on the other hand also connected to the electric motor M by way of a control line 51, so that the electric motor M can be controlled by means of control signals. In this preferred arrangement, the control signals are generated by the calibration control unit 50 based on the information signals $S_{CD}$ and the parameter P.

In the exemplary embodiment, rigidly attached to the movable part 12 of the force-measuring cell 10 is a first end of a force-transmitting arm 32. The second, remote end of the force-transmitting arm 32 forms a seat 33, through which a predefined force $F_C$ can be introduced from the calibration device 40 to the force-measuring cell 10. This force $F_C$ is then transmitted directly through the force-transmitting arm 32 to the force-measuring cell 10. The predefined force $F_C$ thus acts on the force-measuring cell 10 in a similar way as the weight force $F_W$ of the weighing object that is placed on the weighing pan. In this example the predefined force $F_C$ is generated by the weight force of the calibration weight 41 of the calibration device 40 acting on the seat 33.

In the exemplary embodiment, the housing of the calibration device 40 has suitable openings in the housing wall through which the second, remote end of the force-transmitting arm 32 reaches into the interior space of the housing in order to receive the weight force of the calibration weight 41. However, an arrangement is also possible where parts of the calibration weight 41 or its extensions reach through openings in the housing wall, for example elongated holes, to the outside of the housing of the calibration device 40, thereby allowing the calibration weight 41 to be coupled to the force-transmitting arm 32 which is arranged outside of the housing.

Following is a short description of a calibration cycle of an exemplary embodiment of the invention. While a calibration cycle is in progress, there should be no force $F_W$ acting on the force-receiving part 30. Accordingly, there should also be no forces acting on the force-measuring cell 10 at the beginning of the calibration cycle.

At the start of a calibration cycle, the calibration weight 41 is lowered by means of the electric motor M onto the seat 33. Two functions are thereby performed: on the one hand, the calibration device 40 is coupled to the force-measuring cell 10, and on the other hand a predefined force $F_C$, i.e. the weight force of the calibration weight 41, is applied to the force-measuring cell 10.

In the next phase, the measurement signal $S_F$ generated by the force-measuring cell 10 is transmitted to the processing unit 60, where it is converted into a value which is referenced to the predefined force $F_C$ of the calibration weight 41. With the results gained in the processing, the calculation parameters in the processing unit 60 are then optimized for the function of determining an accurate weighing result. However, these results can also be transmitted to the indicator unit 70 or to another processing unit.

To complete the calibration cycle, the calibration weight 41 is lifted up by means of the electric motor M and thereby removed from the seat 33. With this step, the calibration device 40 is uncoupled from the force-measuring cell 10, so that in its normal operating mode the force-measuring cell 10 cannot be influenced by the calibration device 40. When subsequently operating in the normal measurement mode, the measurements of the weighing objects are evaluated by using the optimized calculation parameters.

Figure 3:
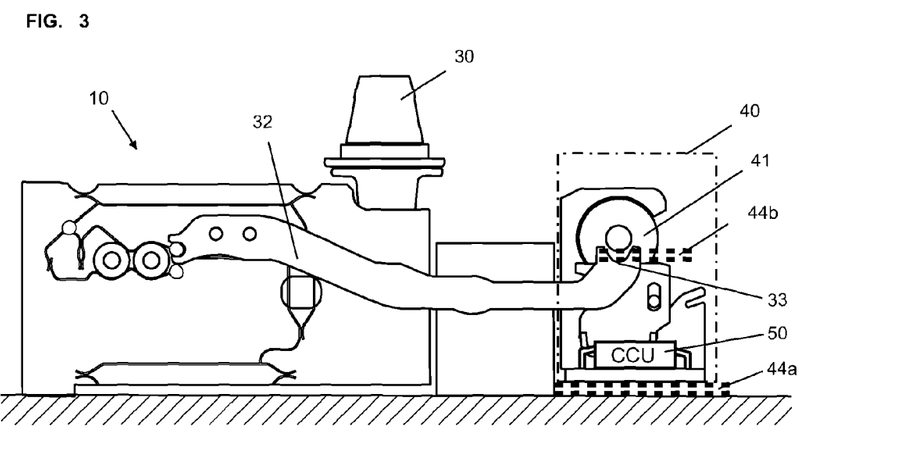
FIG. 3 shows a further example of an embodiment of a force-measuring cell according to FIG. 2, wherein the calibration device can be connected to the force-measuring device by way of two mechanical interfaces providing an exchangeable modular unit.

As a further example of an embodiment, FIG. 3 shows a force-measuring cell 10 in accordance with FIG. 2, wherein the force-transmitting arm 32 is configured as an elongated arm with a seat 33 in the form of indentations. The calibration weight 41 is barbell-shaped, so that its shaft can be lowered into the matching indentations of the seat 33. The force-receiving part 30 is configured as a fastening post on which a weighing pan can be held in place.

The calibration device 40 further has a first mechanical interface 44a and a second mechanical interface 44b which are indicated in FIG. 3 by dotted double lines. The first mechanical interface 44a defines an arrangement of the calibration device 40 in relation to the force-measuring cell 10 according to a predefined dimension. The first mechanical interface 44a can be given in the form of a predefined installation dimension and/or of a part of a guide track and/or a fastening location. Furthermore, the calibration device 40 can be mounted as a modular unit in its own housing, wherein the design of the latter is compatible with a given installation dimension and/or with given fastening locations.

The second mechanical interface 44b serves to define the vertical distance between the seat for the calibration weight and the first mechanical interface 44a, so that this vertical distance conforms to a predefined value. Due to the two mechanical interfaces 44a and 44b, the calibration device 40 constitutes a modular unit which is easy to exchange against another calibration device 40.

The calibration control unit CCU is preferably arranged in immediate proximity below the calibration weight 41. Due to this proximity, the calibration device 40 can be built as a compact, space-saving unit. As a result, this unit (indicated in FIG. 3 by a dash-dotted line) can be combined in a simple manner into a compact, independent assembly unit. Preferably, this unit is arranged on a holder or on a base plate which carries the calibration control unit CCU and a receiving seat for the calibration weight 41 in its rest position. This assembly unit can also be installed in a housing of its own (as shown in FIG. 2) which is separate from the housing 20 of the force-measuring device.

Figure 4:
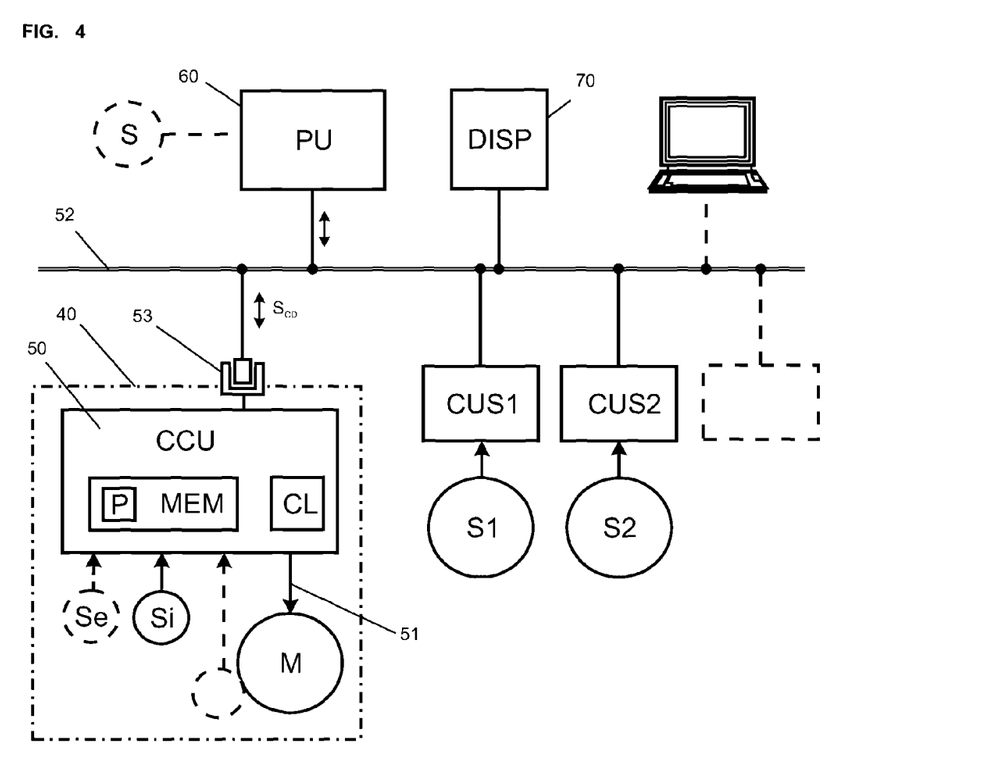
FIG. 4 represents a simplified block diagram of the balance according to FIG. 2 with a communications link for the exchange of information signals $S_{CD}$ between a calibration control unit CCU of the calibration device and a processing unit PU.

FIG. 4 shows a simplified block diagram of the exemplary balance according to FIG. 2 with a communications link 52 which connects different functional units of the force-measuring device 1 to each other. The functional units in this example are a processing unit PU, the calibration control unit CCU, the indicator unit DISP, a first sensor control unit CUS1 which is connected to a first sensor S1, and a second sensor control unit CUS2 which is connected to a second sensor S2. The first sensor S1 can for example be a measurement sensor for the determination of the applied force, whose measurement signal is evaluated in the first sensor control unit CUS1 and transmitted to the processing unit PU. The second sensor S2 can be a temperature sensor whose signal is evaluated in the second sensor control unit CUS2 and likewise transmitted to the processing unit PU. The sensors and their associated control units can also be arranged in any other combination. Furthermore, there can also be a measurement sensor S (in accordance with FIG. 1) connected through a direct signal line to the processing unit PU. In addition, an indicator unit DISP and a further processing unit in the form of a higher level computer can likewise be connected to the communications link 52.

The calibration control unit CCU is preferably connected to the communications link 52 through a standardized electrical connector element 53. In this arrangement, the connector element 53 constitutes an electrical interface, so that different calibration devices 40 can be connected to the communications link 52 without further adaptations. The connector element 52 in this example is indicated symbolically as a separable plug connection. The exchange of the calibration device 40 can thus be performed in a particularly simple manner.

The communications link 52 in this example is configured as a digital bus system, so that digital information signals can be exchanged bidirectionally between the individual functional units. The bus system consists of a plurality of parallel electric conductors. However the communications link 52 can also be implemented in different forms, for example a serial electrical conductor, a wireless connection, or an optical connection. The information signals $S_{CD}$ are preferably exchanged in digital form between the calibration control unit CCU and a processing unit PU. In this case, the information signals $S_{CD}$ are transmitted preferably according to a standardized communications protocol.

For the bus system, one could use for example a system according to one of the standards known as $I^2C$, Profibus, or Ethernet. The information signals can contain the information in the form of binary data, coded instructions and messages, or plain text. Preferably, the size of the instructions and messages is restricted to the essentials in a suitable but adequate manner, so that they can be implemented universally by the widest diversity of calibration control units CCU. An instruction could say, for example, "move downward at a speed of 10 mm/min", and the return message could say "downward move completed".

In an exemplary embodiment, the calibration control unit CCU additionally includes a memory element MEM serving to store data, measurement values or programs. Furthermore, the parameter P is stored in the memory element MEM, so that the values of the parameter P can be accessed by the calibration control unit CCU in read—as well as write mode. The data encompass information that is needed for the operation and monitoring of the calibration device 40 as well as for the control of the communication. Data can be read out of, and written into, the memory element, through direct access by the calibration control unit CCU as well as remote-controlled by the processing unit PU by way of the communications link 52. The memory element MEM is preferably configured as a non-volatile memory and may be implemented in combination with the calibration control unit CCU in the form of a microprocessor.

This information can for example include the type of the electric motor and its characteristics. Also stored can be data that define the dynamic behavior, in particular the time profiles of acceleration and velocity. It is further conceivable to store diagnostic data of the calibration device 40, for example data providing information about overload conditions, symptoms of wear, operating temperatures, or ambient conditions. The data can further include one or more identification codes which serve to address and/or identify the calibration device 40 during communication.

Further included in the calibration control unit CCU is a clock CL, which serves to control velocities and/or accelerations of the electric motor M and thus the movements of the calibration weight. The clock CL can also be used for additional tasks, for example to control the behavior of the calibration device 40 or to register specific events.

The calibration device 40 further includes a sensor Si which is connected to the calibration control unit CCU. Thus, the signals generated by the sensor Si are transmitted to the calibration control unit CCU, where they are used for the control of the electric motor M. The sensor Si is configured in this case as a light gate which signals to the calibration control unit CCU when the calibration weight has reached an end position. The sensor can also be arranged in immediate proximity of the electric motor (broken line), for example in order to determine the angle of rotation of the electric motor. There can further be an additional sensor Se (broken line) arranged in the calibration device which likewise transmits information to the calibration control unit CCU, for example the occurrence of vibrations, in which case the speed of the electric motor is reduced, for example by 50%, so as not to overload the force-measuring cell in the process of coupling the weight to it.

The calibration device 40 and the force-measuring device 1 have been described and illustrated in preferred embodiments. The force-measuring device has been described in the form of a balance 1. However, the invention can also be used in other force-measuring devices, such as gravimetric measuring devices, weighing modules, load cells and measurement sensors, which in some cases can constitute part of a balance. Furthermore, the devices are of course not limited to a specific selection, configuration grouping and application of the components.

What is claimed is:

1. A calibration device for a force-measuring device, the force-measuring device having a force-measuring cell and a processing unit, comprising:
   an electrically controllable force-generating device coupled to the force-measuring cell at a coupling location so that a predefined force can be applied to the force-measuring cell for generating a measuring signal which correlates to the applied force which can be transmitted to the processing unit of the force-measuring cell for processing in reference to the predefined force and wherein the calibration device forms a functional unit with the force-measuring device when the calibration device is coupled to the force-measuring device;
   a first mechanical interface defining the arrangement of the calibration device in relation to the force-measuring cell according to a predetermined dimension;
   a second mechanical interface defining a vertical distance between the coupling location of the force-generating device and the first mechanical interface, the vertical distance conforming to a predefined value;
   a calibration control unit having continuous access to at least one predefined parameter representing a characteristic or operating condition of at least one of the force-measuring device and the calibration device;
   wherein the calibration control unit is connected by a communications link to the processing unit to exchange information signals and wherein the calibration control unit is adapted to generate control signals based on the information signals and the parameter for controlling the force-generating device and wherein the calibration control unit is configured with the ability to make autonomous decisions regarding the control of the force-generating device; and
   the first and second mechanical interfaces allowing the calibration device to be removably and modularly coupled to and used with various types of force-measuring devices, each of the various types of force-measuring devices having different requirements.

2. The calibration device according to claim 1, wherein the calibration control unit is further comprised of a predefined fixed program or an alterable program which serves to process the at least one parameter and the information signals and to generate the control signals.

3. The calibration device according to claim 1, wherein the calibration control unit is further comprised of a non-volatile memory element (MEM) serving to store the parameter and wherein the calibration control unit is adapted to use at least one characteristic property of the force-generating device in generating the control signals for controlling the force-generating device.

4. The calibration device according to claim 1, wherein the parameter represents the measurement range or the measurement accuracy or the stability of the measurements or the intended area of application of the force-measuring device.

5. The calibration device according to claim 1, wherein the parameter represents at least one dimension in space which defines the coupling of the force-generating means to the force-measuring cell.

6. The calibration device according to claim 1, wherein the parameter represents the type of the force-generating device, or the magnitude of the force to be generated, or the rate of change or acceleration of change of the force, or the length of a displacement interval of the force-generating device.

7. The calibration device according to claim 1, wherein the calibration control unit is adapted to exchange information signals in at least one of the following formats: digital or coded or in bidirectional mode or in the form of data packets.

8. The calibration device according to claim 1, wherein the calibration control unit comprises a logic interface, so that the transmitted information can be exchanged according to a predefined, standardized specification or in accordance with a communications protocol.

9. The calibration device according to claim 1, wherein the calibration device comprises a clock for controlling the registration of events or the detection of defects, and wherein the calibration device is adapted to store the specific event or the occurrence of the defect into a log file with a time marker.

10. The calibration device according to claim 1, wherein the force-generating device comprises a calibration weight for generating the predefined force and wherein the force-generating device can be coupled to the force-measuring cell.

11. The calibration device according to claim 1, wherein the calibration control unit is arranged on a holder or base plate which supports the force-generating device.

12. The calibration device according to claim 1, wherein the calibration device comprises at least one sensor which is connected to the calibration control unit and which generates an electrical signal used to control the force-generating device, wherein the sensor is adapted to detect at least one of the following conditions: a play under changing loads, a position change, a temperature, a current/voltage supply, an ambient temperature, a mechanical disturbance, or vibration.

13. The calibration device according to claim 1, wherein the calibration device is coupled to the force-measuring cell during a calibration cycle for applying predefined force, and wherein the force-measuring cell is connected by the communications link to the processing unit for transmitting the measurement signal generated by the measurement force-measuring cell.

14. The calibration device according to claim 13, wherein the processing unit is adapted to perform at least one of the following actions: determine or calculate the parameter or transmit the parameter to the calibration control unit or read the parameter from the calibration control unit.

15. The calibration device according to claim 1, wherein the calibration control unit is adapted to receive the parameter from the processing unit through the exchange of the information signals.

16. The calibration device according to claim 1, wherein the calibration control unit is arranged so that the spatial distance between the calibration control unit and the force-generating device is significantly shorter than the spatial distance between the calibration control unit and the processing unit.

17. A calibration device for a force-measuring device, the force-measuring device having a force-measuring cell and a processing unit, comprising:
an electrically controllable force-generating device coupled to the force-measuring cell at a coupling location so that a predefined force can be applied to the force-measuring cell for generating a measuring signal which correlates to the applied force which can be transmitted to the processing unit of the force-measuring device for processing in reference to the predefined force and wherein the calibration device forms a functional unit with the force-measuring device when the calibration device is coupled to the force-measuring device;
a first mechanical interface defining the arrangement of the calibration device in relation to the force-measuring cell according to a predetermined dimension;
a second mechanical interface defining a vertical distance between the coupling location of the force-generating device and the first mechanical interface, the vertical distance conforming to a predefined value;
a calibration control unit connected by a communications link to the processing unit to exchange information signals and wherein the calibration control unit is adapted to generate control signals based on the information signals for controlling the force-generating device and wherein the calibration control unit is configured with the ability to make autonomous decisions regarding the control of the force-generating device; and
the first and second mechanical interfaces allowing the calibration device to be removably and modularly coupled to and used with various types of force-measuring devices, each of the various types of force-measuring devices having different requirements.

18. A calibration device for a force-measuring device, the force-measuring device having a force-measuring cell and a processing unit, the calibration device comprising:
an electronically controllable force-generating device coupled to the force-measuring cell at a coupling location so that a predefined force can be applied to the force-measuring cell for generating a measuring signal which correlates to the applied force which can be transmitted to the processing unit of the force-measuring cell for processing in reference to the predefined force;
calibration control unit adapted to communicate with the force-measuring cell, the calibration control unit programmed with instructions for executing on the processing system to: 1) access to at least one predefined parameter representing a characteristic or operating condition of at least one of the force-measuring device and the calibration device; 2) exchange information signals with the processing unit of the force-measuring cell; 3) process the information signals and the parameter; and 4) generate control signals for controlling the force-generating device based on the information signals and the parameter;
a communications link adapted to exchange electronic data between the processing unit and the calibration control unit;
a first mechanical interface defining the arrangement of the calibration device in relation to the force-measuring cell according to a predetermined dimension;
a second mechanical interface defining a vertical distance between the coupling location of the force-generating device and the first mechanical interface, the vertical distance conforming to a predefined value; and
wherein the first and second mechanical interfaces allow the calibration device to be removably and modularly coupled to and used with various types of force-measuring devices, each of the various types of force-measuring devices having different requirements.

19. A calibration device according to claim 18, wherein the generated control signals are optimally adapted for the force-generating device.

20. A calibration device according to claim 18, wherein the calibration control unit is configured with the ability to make autonomous decisions regarding the control of the force-generating device.

21. A calibration device according to claim 18, wherein the calibration control unit is programmed with instructions for executing on the calibration control unit to correlate the predefined force and measurement values from the force-measuring cell and adjust the calibration parameters in the processing unit.

22. A calibration device according to claim 18, wherein the calibration control unit is programmed with instructions for executing on the calibration control unit to generate control signals based on specific requirements of the force-measuring device.

23. A calibration device according to claim 18, wherein the calibration control unit is programmed with instructions for executing on the calibration control unit to communicate information to the processing unit of the force-measuring device for calculating correction parameters.

24. A calibration device according to claim 18, wherein the parameter is a characteristic of the force-generating means and wherein the generated control signals are generated based on this characteristic.

25. A calibration device according to claim 18, wherein the calibration control unit is programmed with instructions for executing on the calibration control unit to reprogram under controls from the processing unit.

26. A calibration device according to claim 18, further comprising a sensor in electrical communication with the calibration control unit of the calibration device for generating an electrical signal for use in controlling the force-generating device.

27. A calibration device according to claim 18, wherein the first mechanical interface is a guide track.

* * * * *